United States Patent [19]
Main

[11] Patent Number: 6,164,730
[45] Date of Patent: Dec. 26, 2000

[54] ANTI-THEFT SYSTEM FOR USE ON A TRACTOR/TRAILER LAND VEHICLE

[76] Inventor: Lou Main, 1709 Sunny Crest La., Bonita, Calif. 91902

[21] Appl. No.: 09/160,185

[22] Filed: Sep. 25, 1998

[51] Int. Cl.[7] .................................................. B60T 17/16
[52] U.S. Cl. .............................................. 303/89; 303/15
[58] Field of Search ............................. 303/89, 7, 9, 13, 303/15, DIG. 3, DIG. 4, 10; 188/353, 265, 3 R, 3 H

[56] References Cited

U.S. PATENT DOCUMENTS

| | | |
|---|---|---|
| 3,885,164 | 5/1975 | Vest . |
| 4,691,801 | 9/1987 | Mann et al. ............................ 180/287 |
| 4,924,206 | 5/1990 | Ayres . |
| 4,991,683 | 2/1991 | Garretto et al. . |
| 5,041,810 | 8/1991 | Gotanda . |
| 5,344,221 | 9/1994 | MacWilliam . |
| 5,378,929 | 1/1995 | Mor et al. ................................. 303/89 |
| 5,595,258 | 1/1997 | Georgas et al. ...................... 303/89 X |

*Primary Examiner*—Douglas C. Butler
*Assistant Examiner*—Melanie Talavera
*Attorney, Agent, or Firm*—Terry M Gernstein

[57] ABSTRACT

An anti-theft system prevents release of the brakes of a tractor/trailer land vehicle after the manual brake control has been set and after the anti-theft system has been activated. With the anti-theft system activated, any attempt to release the brakes of the vehicle will not be successful and will activate an alarm. The anti-theft system cannot be activated until after the manually operated brake control has been activated. The anti-theft system can be applied to the brakes of either or both the tractor and/or the trailer of the vehicle.

15 Claims, 10 Drawing Sheets

ANTI-THEFT SYSTEM FOR USE ON A TRACTOR/TRAILER LAND VEHICLE

TECHNICAL FIELD OF THE INVENTION

The present invention relates to the general art of land vehicles, and to the particular field of anti-theft systems for use in land vehicles, specifically, tractor/trailer systems.

BACKGROUND OF THE INVENTION

As is well known, auto theft is a major problem in the United States and throughout the world. Most auto thefts occur when the vehicle is unoccupied and the owner is elsewhere. To combat this, the industry has proposed many different types of alarm and anti-theft systems. These systems range from simple mechanical locks which prevent mechanical operation of some element of the vehicle, such as the steering wheel, the brake pedals, the clutch or the like to audible and/or visible alarms and sophisticated tracking systems that are triggered when unauthorized use of the vehicle is attempted when the alarm or system is armed to systems for disabling some operation of the vehicle, such as the electrical system of the vehicle.

While many anti-theft systems appear to be available for automobiles, the trucking industry has seen a dearth of anti-theft systems. To the knowledge of the inventor, the only system used for tractor trailer type trucks is a satellite tracking system that tracks merchandise and is not intended for use for preventing theft of the truck and/or trailer.

Therefore, there is a need for an anti-theft system particularly adapted to preventing unauthorized use of a truck, such as a tractor-trailer type truck.

However, while preventing theft of a truck, the system must permit safe operation of the vehicle and not interfere with such safe operation. Some anti-theft systems which disable an operating system of the vehicle could interfere with the safe, authorized operation of the vehicle.

Therefore, there is a need for an anti-theft system particularly adapted for preventing unauthorized use of a truck, yet which permits safe authorized use of the truck.

OBJECTS OF THE INVENTION

It is a main object of the present invention to provide an anti-theft system particularly adapted for use on a tractor trailer type truck or such land vehicle.

It is another object of the present invention to provide an anti-theft system particularly adapted for use on a tractor trailer type truck which prevents unauthorized operation of the truck.

It is another object of the present invention to provide an anti-theft system particularly adapted for use on a tractor's trailer which prevents unauthorized operation of the trailer.

It is another object of the present invention to provide an anti-theft system particularly adapted for use on a tractor trailer type truck which prevents unauthorized operation of the truck yet which will not interfere with the authorized use of the truck.

SUMMARY OF THE INVENTION

These, and other, objects are achieved by an anti-theft system which is specially adapted for use on land vehicles such as trucks, specifically tractor trailer type trucks. The present disclosure will be directed to trucks and tractor trailers, but this is intended to be a disclosure of the best mode and is not intended to be limiting. The system disables the brake system of the vehicle after that brake system has been activated to prevent rotation of at least one road wheel of the vehicle. The anti-theft system is connected with the brake system of the vehicle in a manner such that the anti-theft system cannot be activated until after the manual brake has been activated.

Thus, the anti-theft system cannot be operated until after the manual brake has been activated, but will prevent de-activating the brake system until after the anti-theft system has been deactivated. This can be visualized as the following process: Activation of the anti-theft system requires first activating the manual brake system of the vehicle and then activating the anti-theft system; de-activation of the anti-theft system requires first de-activating the anti-theft system and then de-activating the manual brake system of the vehicle.

However, once the anti-theft system is activated, the vehicle cannot be moved until the anti-theft system is de-activated. This can be visualized as an "ONLY IF" process: the anti-theft system can be activated "only if" the manual brake has been previously activated; whereas, once the anti-theft system has been activated, the vehicle can be moved "only if" the anti-theft system is de-activated before de-activating the manual brake of the vehicle. In this manner, the anti-theft system cannot be inadvertently activated during authorized operation of the vehicle. This is a safety feature of the present invention.

A visible signal is placed in the vehicle and is activated when the anti-theft system is activated to indicate that the anti-theft system is active, and an alarm, such as a horn or siren, is connected to the anti-theft system to be activated when there is an attempt to de-activate the manual brake before the anti-theft system is de-activated. An alternative form of the invention has the anti-theft system connected to the trailer portion of the tractor-trailer vehicle as well as to the tractor portion of the vehicle.

BRIEF DESCRIPTION OF THE DRAWING FIGURES

Other objects, features and advantages of the invention will become apparent from a consideration of the following detailed description and the accompanying drawings.

DETAILED DESCRIPTION OF THE PREFERRED EMBODIMENT OF THE INVENTION

As discussed above, the present invention is an anti-theft system particularly adapted for use on a tractor-trailer type land vehicle. The anti-theft system is enabled after the manual brake of the vehicle is activated to engage the brakes of the vehicle, and then activates an alarm if there is an attempt to disengage the manual brake without first disabling the anti-theft system. The anti-theft system cannot be activated until the manual brake is first engaged so the anti-theft system will not interfere with the authorized operation of the vehicle. The anti-theft system prevents disengagement of the brakes of the vehicle and can, if desired, activate an alarm as well.

The brake system of a tractor trailer motor vehicle includes brakes that are spring biased into a wheel-stopping position and has an air system that counters this bias and prevents the brakes from moving into a wheel stopping position during operation of the vehicle. By way of example, reference is made to FIG. 1B which shows a brake mechanism B having a bias element, such as spring S in housing H. Wheel brakes are operated by element E which moves axially in directions C1 and C2, with direction C1 applying the brake to stop rotation of the associated wheel. A diaphragm D1 co-operates with housing H to define a first air chamber A1 having an air inlet line MB1 fluidically connected to the manual brake of the vehicle, and a diaphragm D2 which co-operates with housing H to define a second air chamber A2 having a foot brake air input line FB1 fluidically connected thereto. Spring S biases diaphragm D1 in direction C1 and diaphragm D2 in direction C2 whereby the spring will move element E in direction C1 when fluid is removed from chamber A1 and element E will move in direction C2 when fluid is moved into chamber A2. Thus, when the manual brake is operated, fluid flows out of chamber A1 so the brake is applied when element E moves in direction C1, and when the foot brake is operated, diaphragm D2 will be moved in direction C1 against the bias of spring S to apply the brake.

Operating the brakes, as by pressing on the foot pedal pressurizes air chamber A2 and moving element E of diaphragm D2 in direction C1 for overriding the bias of spring S for applying the brakes. Applying the manual brake (also known as the parking brake), vents the air pressure that is preventing the bias from moving the brakes into a wheel stopping configuration. As soon as the air line is vented, the bias of the brake system moves the brakes into the wheel stopping configuration. Releasing the brakes, as by releasing the foot pedal (which will release air pressure from chamber A2, and hence the spring), or releasing the manual brake (which will re-pressurize chamber A1 which re-pressurizes the brake system) releases the wheel or wheels.

The present invention uses this feature of the tractor trailer vehicle to prevent unauthorized use of the vehicle. The present system places a port in the air line of the manual parking brake system and keeps that port closed until the anti-theft system is de-activated. In this manner, even if the brakes of the vehicle are released, air pressure to the brakes will not be re-established because the port blocks this air circuit. Thus, until the port is opened by deactivating the anti-theft system the vehicle cannot be moved because the brakes will remain engaged due to the bias of the brakes because air pressure that counters the bias cannot be applied to the brakes since the air pressure is blocked to chamber A1 to overcome the spring bias to release the brakes.

The anti-theft system of the present invention also has a safeguard that prevents activation of the anti-theft system until after it receives a signal from the manual brake of the vehicle that the manual brake has been set. This prevents the system from malfunctioning into a brake applying configuration if the vehicle is being operated with the manual brake disengaged.

Figure 1:
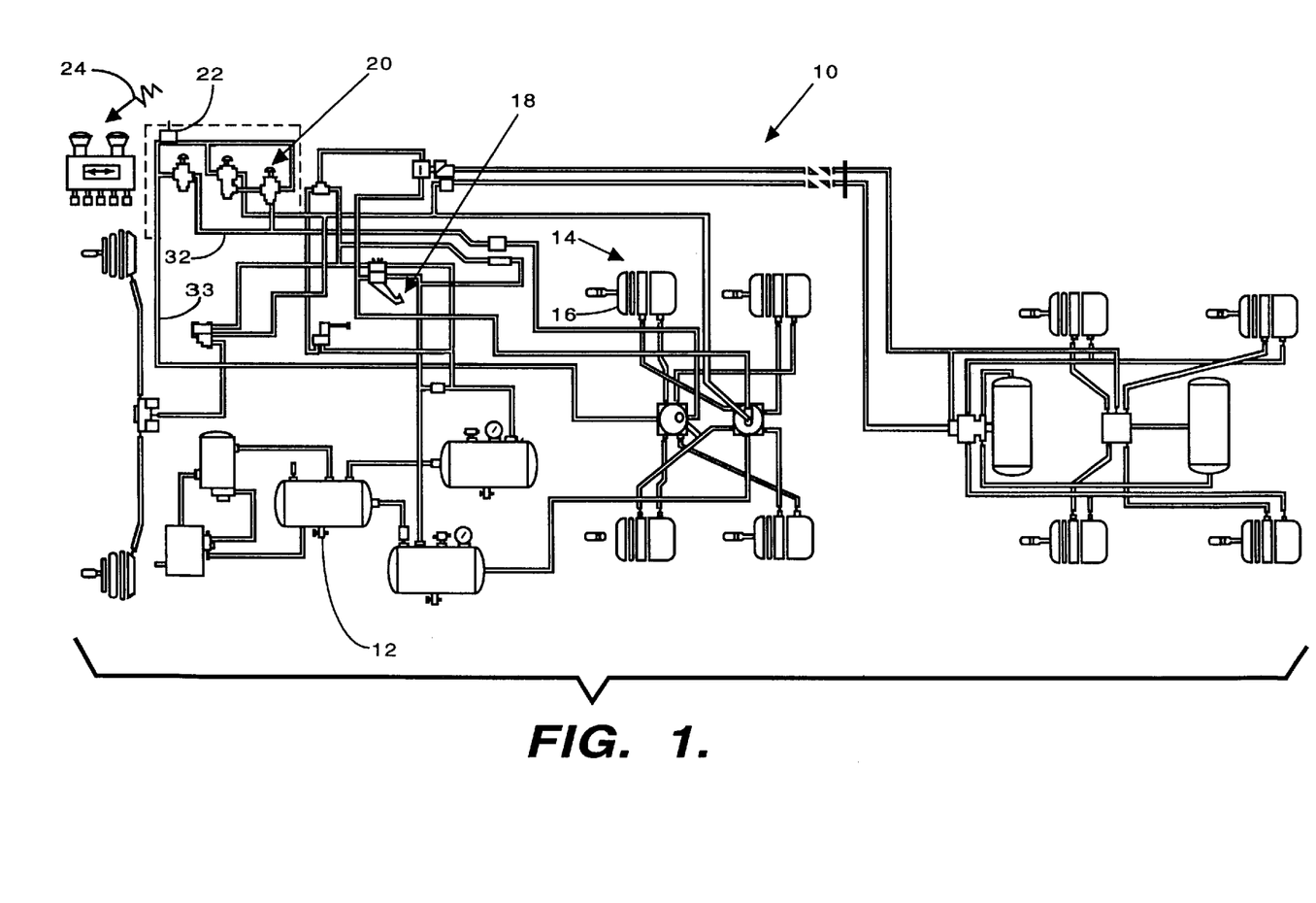
FIG. 1A is a schematic showing the overall fluid circuit of a braking system for a tractor trailer motor vehicle.
FIG. 1B shows a brake of the type used in conjunction with the present invention.
Figures 1A, 1B:
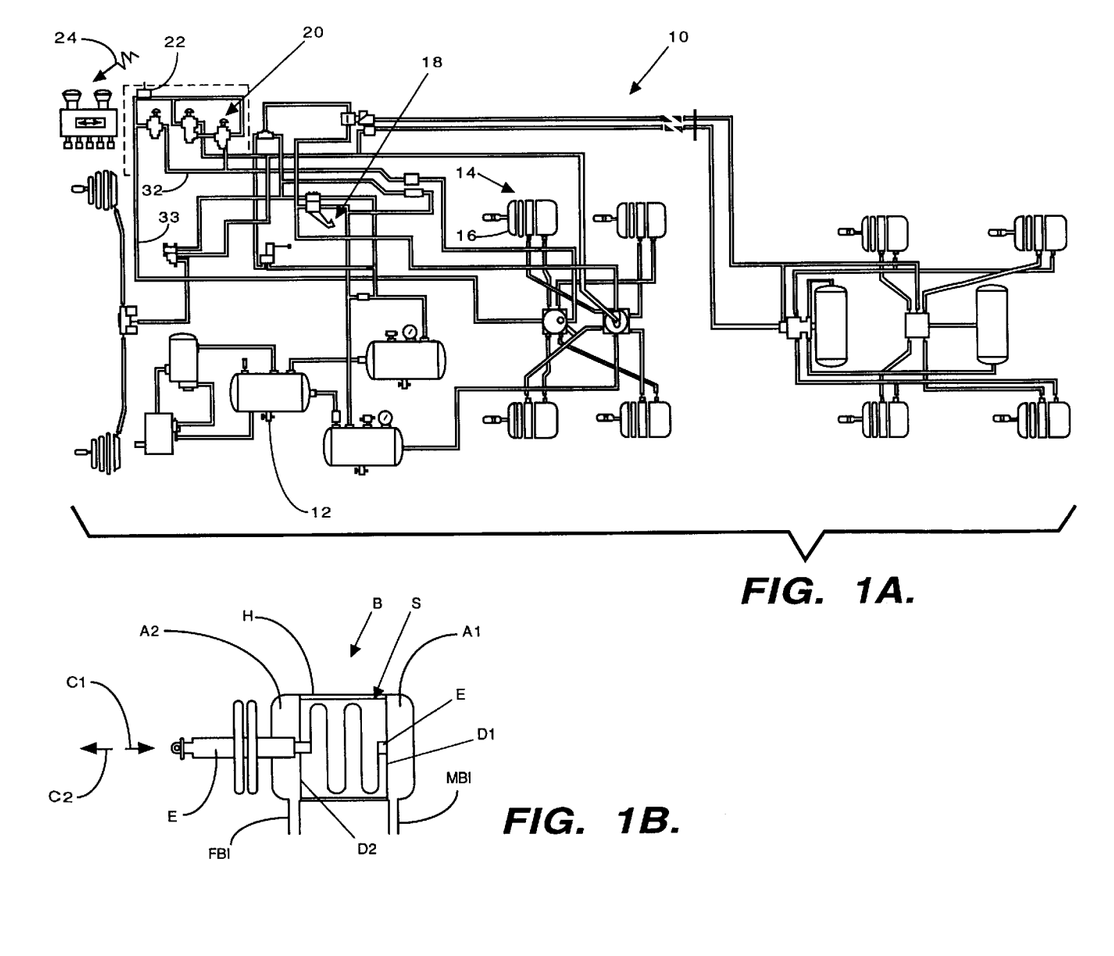

More specifically, referring to FIGS. 1B–4, the air brake system 10 of the present invention includes a source of air 12 and an air-operated brake means 14 for stopping rotation of at least one motor vehicle road-engaging wheel. As shown in FIG. 1A and discussed above, the air-operated brake means 14 includes a spring-biased mechanism 16 that is biased to apply the brake to stop wheel rotation when the foot operated brake is pressed, and/or when the manual brake is actuated. This occurs by applying air against spring bias when the foot operated brake is activated, and removing the air that counters spring bias when the manual brake is actuated. Braking system 10 includes a manually-operated control means such as foot pedal 18 or manual parking brake 20 for releasing or applying air pressure in biased mechanism 16 as needed to set brake means 10 when activated. When brake means 10 is de-activated, as by releasing foot pedal 18 or releasing parking brake 20, source of air pressure 12 is fluidically connected to biased mechanism 16 of brake system 10 to release or apply air pressure as necessary to the biased mechanism to work with the bias of the biased mechanism for releasing the brake means and permitting rotation of the wheel associated with the brake. While four brake/wheel combinations are shown in FIG. 1, more or less can be used as will occur to those skilled in the art based on the teaching of this disclosure. Each wheel/brake combination will operate and function as has been just discussed.

Manually-operated control means 20 further includes a signal transmitter 22 for emitting a signal 24 which can be an over-the-air signal or a closed signal, when manually-operated control means 18 or 20 is activated to set brake means 14 into a wheel rotation preventing configuration. The function of signal 24 will be understood from the following disclosure.

A first fluid line 30 fluidically connects air source 12 to manually-operated control means 20 and a second fluid line 32 fluidically connects manually-operated control means 20 to biased mechanism 16 of brake means 10. Various valves and fittings are also included, but will not be discussed as they form no part of the invention. As discussed above, when brake means 20 is activated, air pressure from brake means 14 is vented via relay valve R-14 and is thus withdrawn from application to brake means 14. This release of air pressure causes the spring biased mechanism in brake means 14 to apply the brakes to the wheel associated therewith. Releasing brake means 20 re-establishes the fluid path between air reservoir 12 and brake means 14 to re-apply air pressure to the brake means and to overcome the spring bias thereof and thus remove the brake from the wheel.

Figure 2:
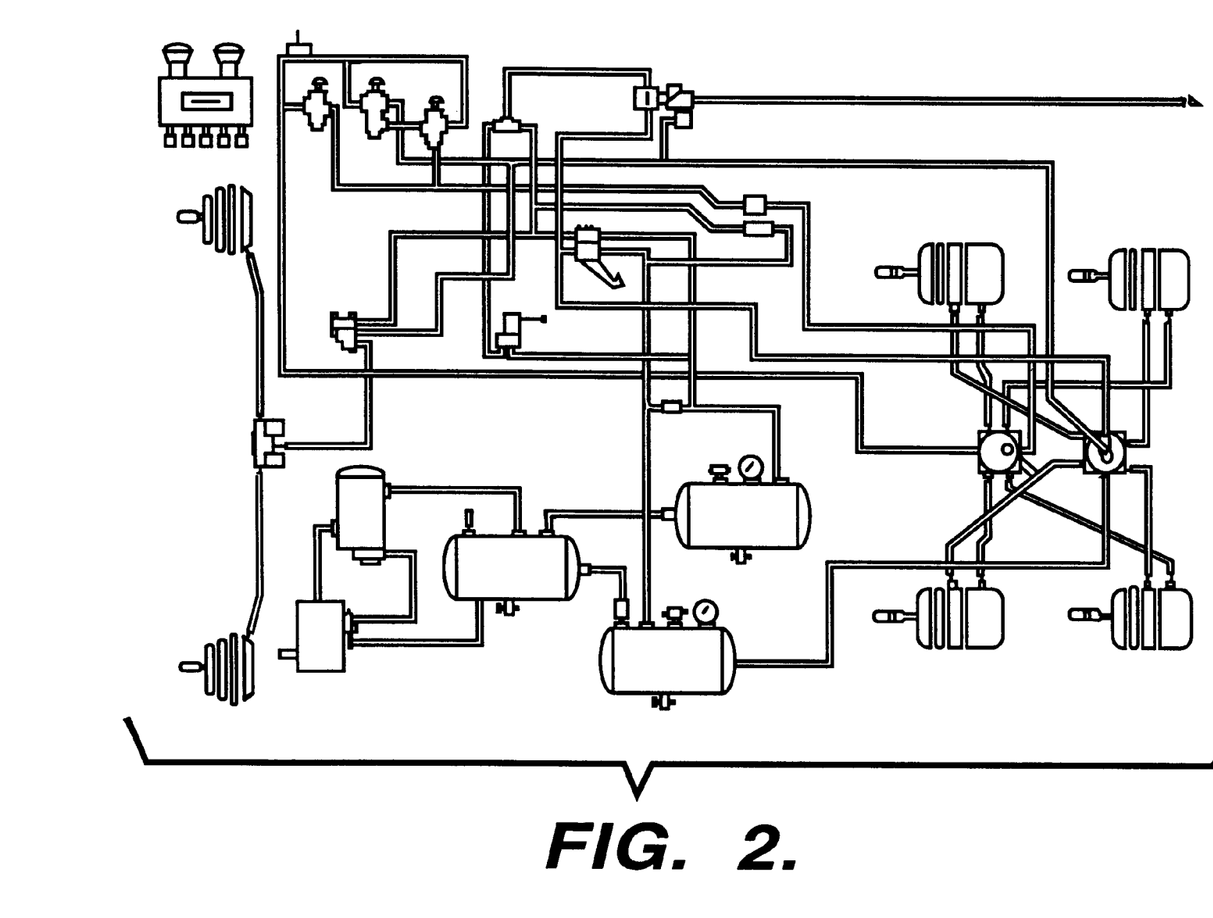
FIG. 2 is a schematic of the braking system for the tractor portion of the tractor trailer motor vehicle.
Figure 3:
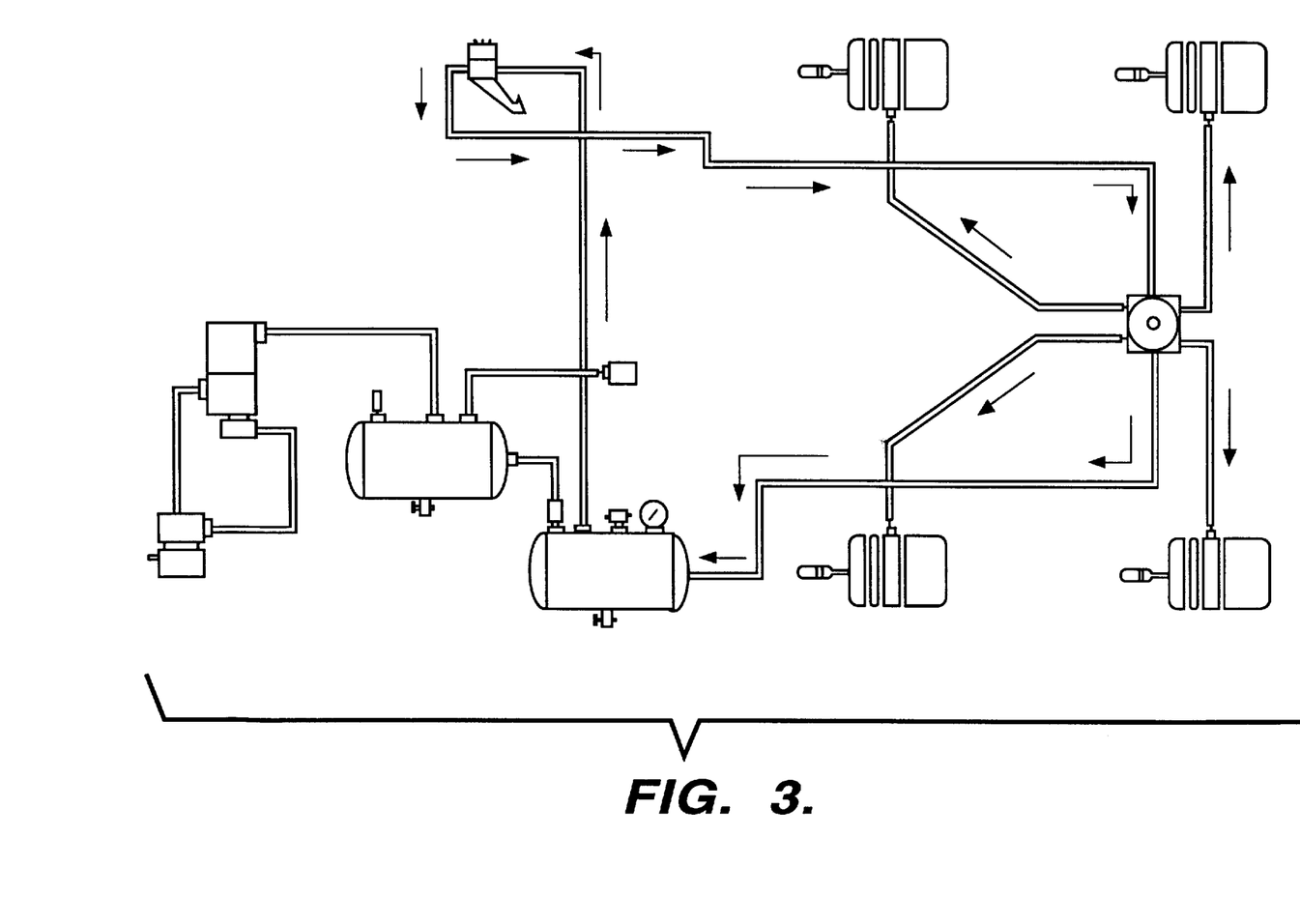
FIG. 3 is a schematic illustrating operation of the foot operated braking system of a tractor trailer motor vehicle.
Figure 4:
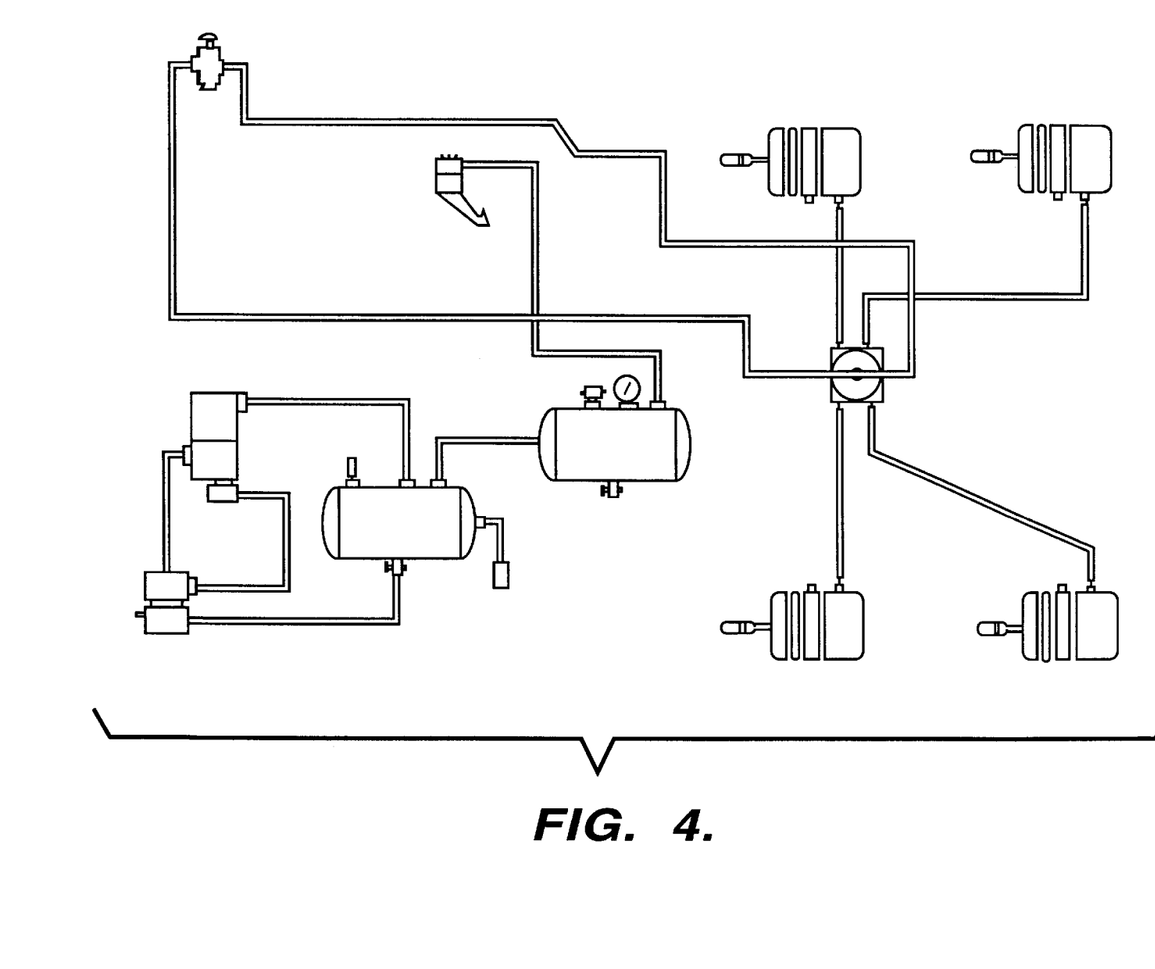
FIG. 4 is a schematic illustrating operation of the manually-operated braking system of a tractor trailer motor vehicle.

Foot operated brake means 18 works in the manner discussed above. Therefore, the operation of foot brake means 18 will not be discussed. The fluid circuits for brake means 18 and 20 are shown in FIGS. 1, 2 and 3, and reference is made thereto for the details of the operation of the overall brake system. Those skilled in the art will understand such operation from these figures.

Figure 5:
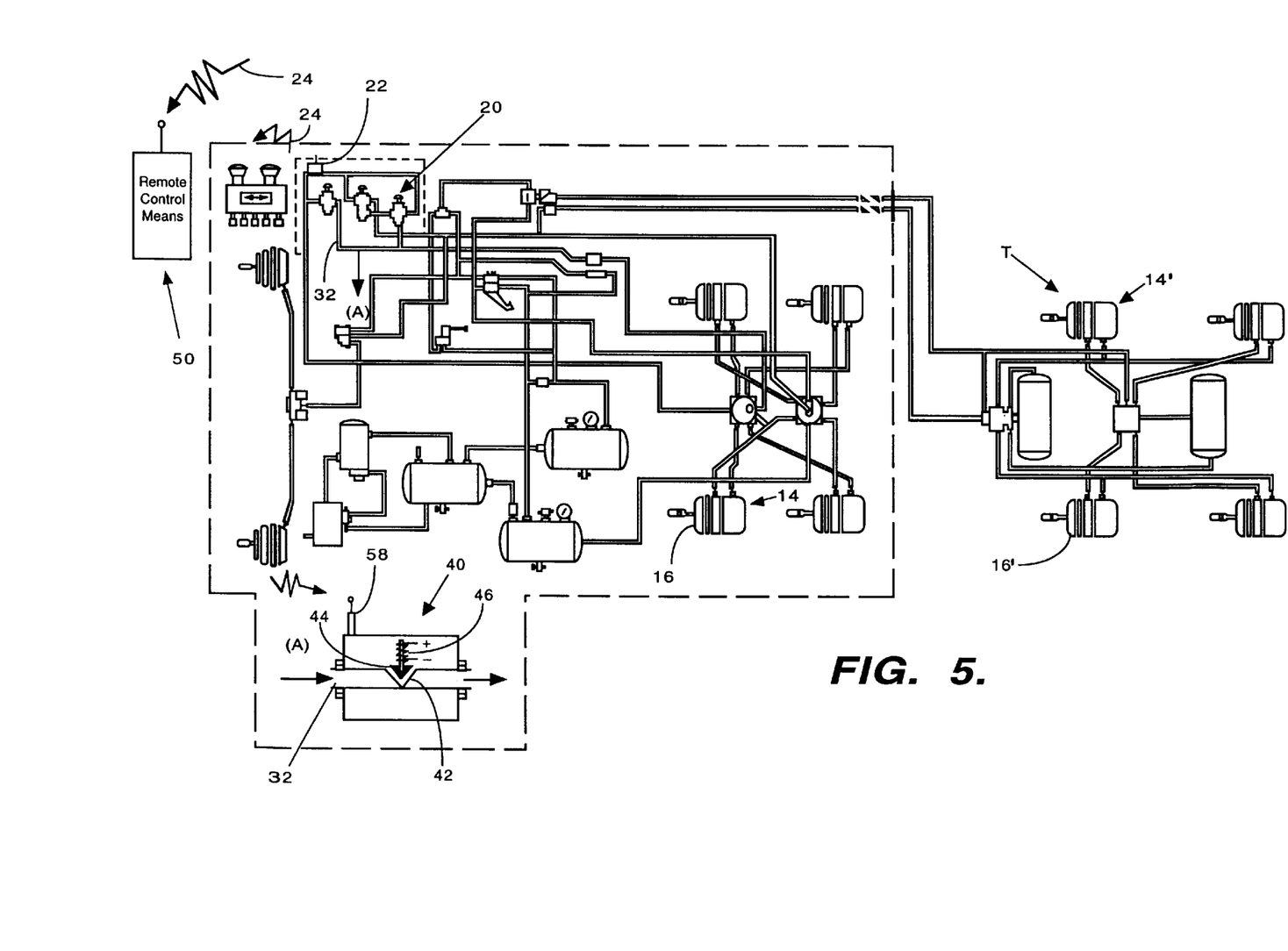
FIG. 5 is a schematic showing the overall fluid circuit of a braking system for a tractor trailer motor vehicle with the anti-theft system included in the tractor portion thereof.
Figure 6:
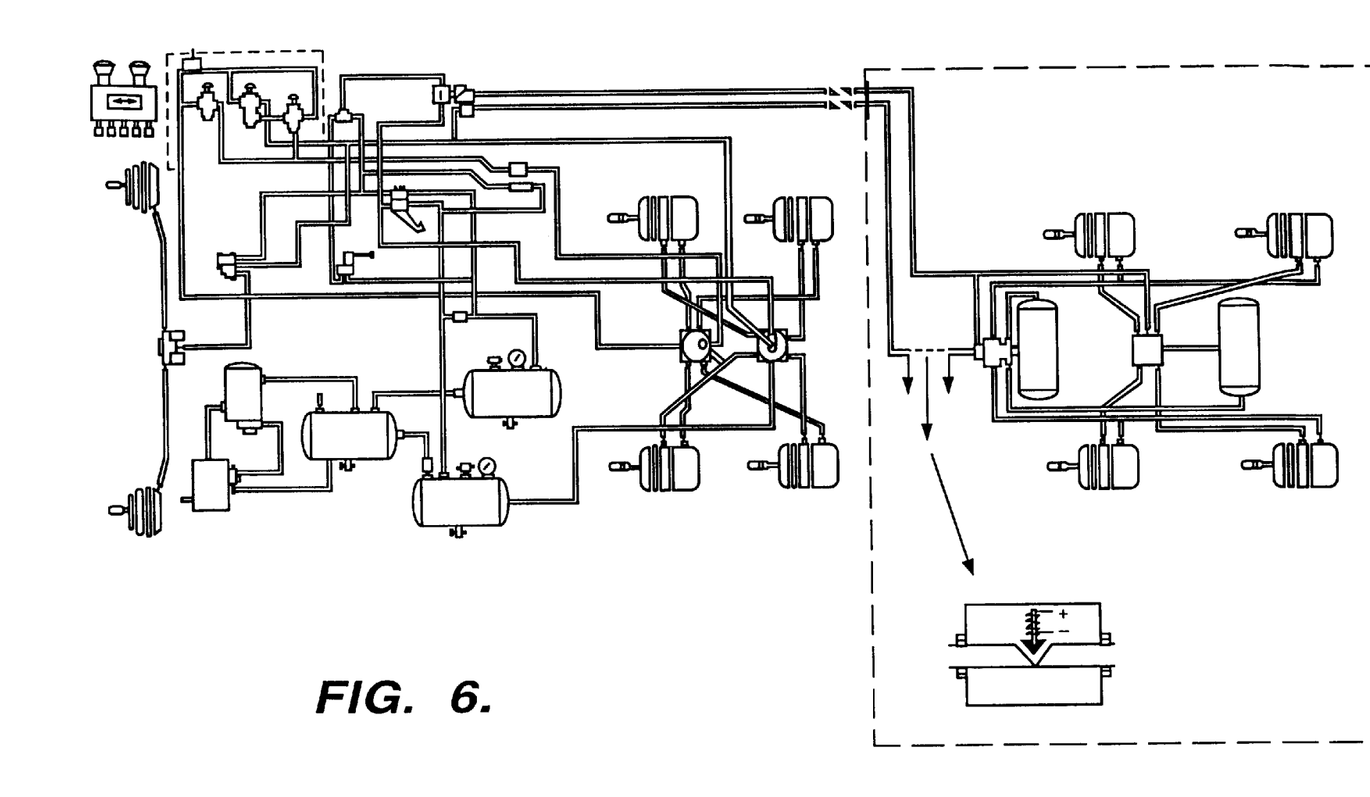
FIG. 6 is a schematic showing the overall fluid circuit of a braking system for a tractor trailer motor vehicle with the anti-theft system included in the trailer portion thereof.

The anti-theft system of the present invention uses the special operation of brake system 10 for its operation. Referring to FIG. 5 it can be understood that the anti-theft system of the present invention includes a control valve 40 fluidically located in second fluid line 32 in fluid series between manually-operated control means 20 and biased mechanism 16 of air-operated brake system 14. Control valve 40 includes a vent port 42 in second fluid line 32, a port-covering valve means 44 on second fluid line 32 for closing and opening vent port 42. A solenoid controlled mechanism 46 is connected to port-covering valve means 44 to move port-covering valve means 44 to a port opening position shown in solid lines in FIG. 5 when deactivated to a port closing position covering and closing port 42 when activated whereby air pressure cannot be applied to spring-biased mechanism 16 of the air-operated brake system through second fluid line 32 when port-covering valve means 44 is in the port closing position and air pressure can be applied to spring-biased mechanism 16 of brake 14 of air-operated brake system 10 through second fluid line 32 when port-covering valve 44 is in the port opening position.

A remote control means 50 is used to activate mechanism 46 of control valve 40 to close port 42 to prevent release of air-operated brake means 14 after activation of manually-operated control means 20 into a brake-setting configuration even if manually-operated control means 20 is then moved back into a brake-releasing configuration and de-activates the mechanism 46 of control valve 40 to cover vent port 42 for releasing air-operated brake means 16 when manually-operated control means 20 is thereafter moved into the brake-releasing configuration. When port 42 is open to atmosphere, air pressure cannot be applied to chamber A1 to overcome the bias of mechanism 16 so the brakes remain applied to the wheels and rotation of those wheels is thereby prevented.

Figure 8:
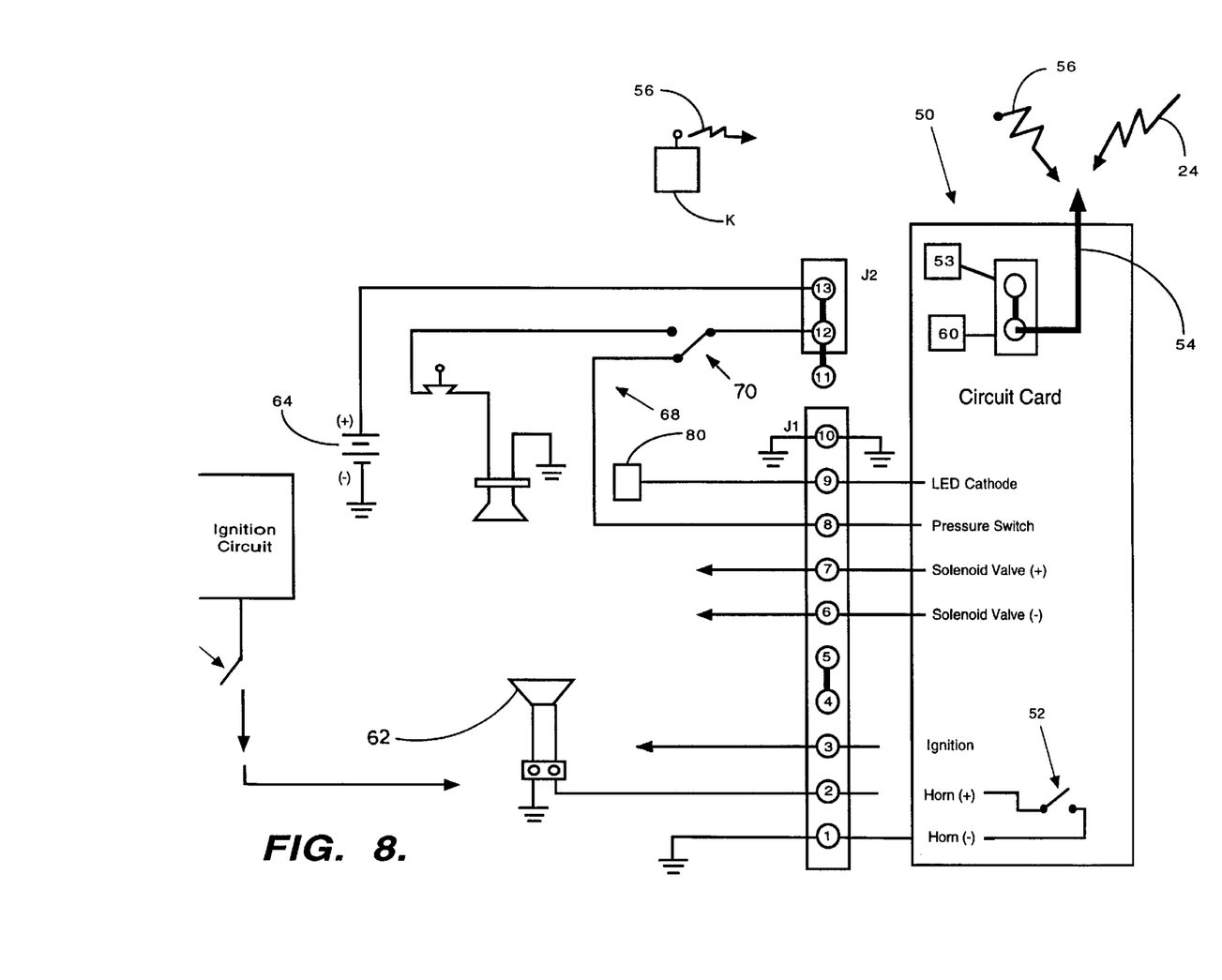
FIG. 8 is an electrical schematic of the anti-theft system of the present invention for the tractor portion of the tractor-trailer vehicle.
Figure 9:
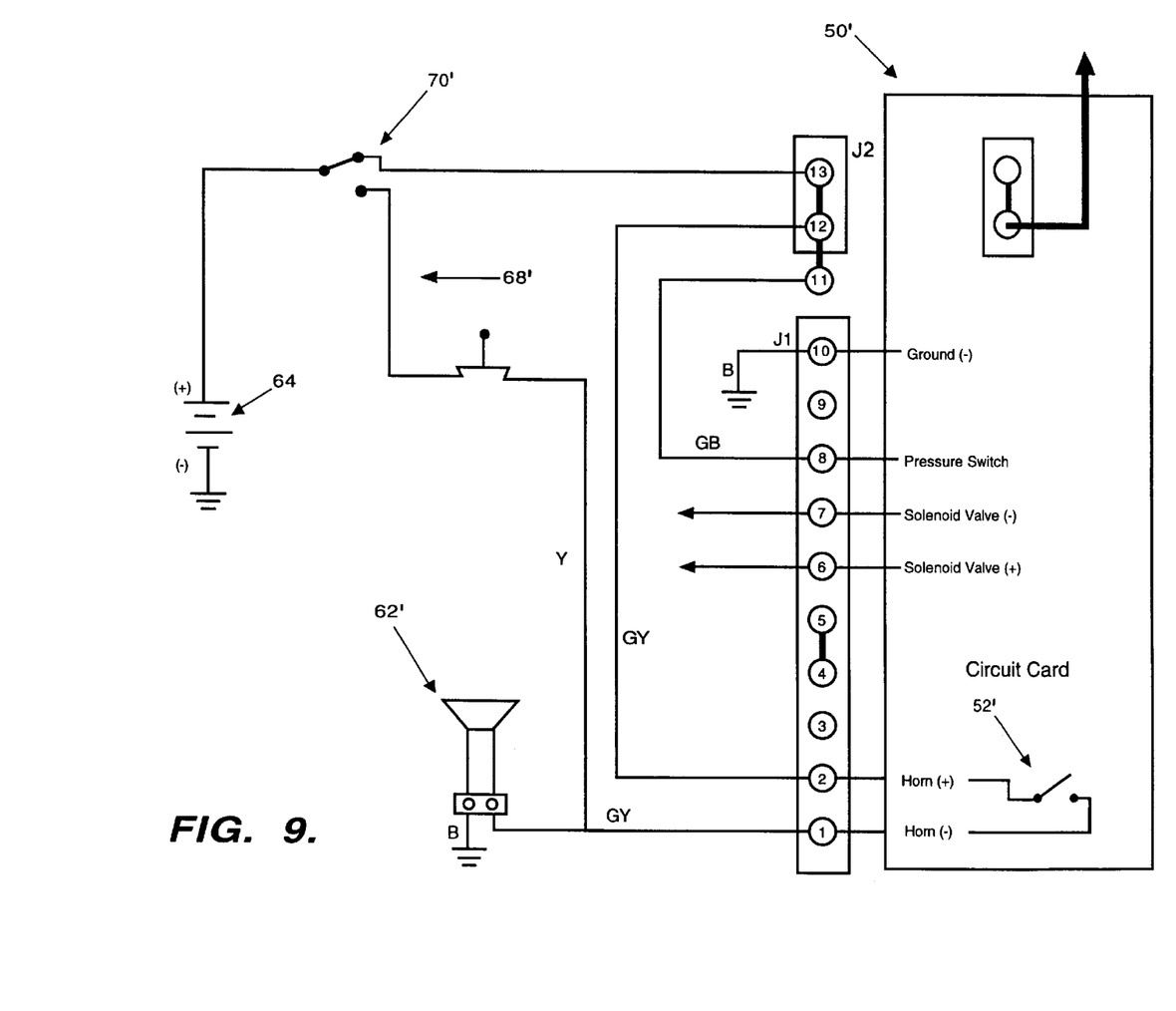
FIG. 9 is an electrical schematic of the anti-theft system of the present invention for the trailer portion of the tractor-trailer vehicle.

Referring to FIGS. 5, 8 and 9, it will be seen that remote control means 50 includes a electronically-operated means 52 for activating and de-activating the siren. A signal transmitter 53 connected to antenna 54 which emits a signal 56 when remote control means 50 is activated. A signal receiver 58 is located in control valve 40 and is responsive to signal 56 emitted by the signal transmitter 53 in remote control means 50 for activating mechanism 46 in control valve 40 to move port-covering valve 44 into the port closing position after manually-operated control means 20 has been activated.

Remote control means 50 further includes a signal receiver 60 connected to transmitter/receiver antenna 54 and is responsive to signal emitted 24 by manually-operated control valve 20 when the manually-operated control valve is activated to permit activation of remote control means 50 and permit remote control means 50 to be operated for activating mechanism 46 of control valve 40 whereby remote control means 50 will not be activated and thus cannot be operated until after manually-controlled means 20 has been activated into a brake setting condition.

Referring more specifically to FIGS. 8 and 9 for details of the anti-theft system, the anti-theft system utilizes an electrical ignition circuit means for operating the motor vehicle, and further includes an audible alarm, such as horn 62, power means, such as vehicle battery 64, for powering alarm 62, and means 66 for connecting and disconnecting the ignition circuit means to power means 64, and an alarm circuit means 68 for connecting alarm 62 to power means 64 when manually-operated control means 20 is operated while mechanism 46 of control valve 40 is in the port closing position.

More specifically, alarm circuit means 68 a normally-closed pressure-sensitive switch 70 which, when activated, is biased onto a normally open position when manually-operated control means 20 is in position to apply air pressure to biased mechanism 16 of air-operated brake means 14 and which moves into a closed position for connecting power supply 64 to alarm 62 when manually-operated control means 20 is moved into a position to connect air source 12 to biased mechanism 16 of air-operated brake 14 after pressure-sensitive switch 70 is activated. Remote control means 50 is activated and de-activated by a remote control receiver, such as switch 52. As can be understood from FIG. 8, means 46 is operated via junctions 6 and 7 while pressure switch 70 is operated via junctions 8 and 12, with power being applied from source 64 via junction 13. The exact circuitry used to make these connections will not be discussed since those skilled in the art will understand how to effect the wiring based on the disclosure of this invention.

As can be understood from FIG. 8, horn 62 is connected to the remote control receiver via junction 2 and junction 1 is a ground junction so that when switch 52 is closed horn 62 is powered and is thus activated. Switch 52 is a momentary switch that will complete the circuit when actuated and will interrupt the circuit when released. As will also be understood, receiver 50 is connected to manual control 20 so the remote control is not operable until the manual control 20 is activated to set the brakes of the vehicle. Once the remote control is activated, pressure sensed by switch 70 will activate the alarm and element 44 will remain covering port 42 so air pressure cannot be applied to brake element 16.

A visible signal 80 is located in the motor vehicle and is connected to remote control 50 via junction 9 to be activated when the remote control is activated and serve as a visible signal that the remote control is active.

Figure 7:
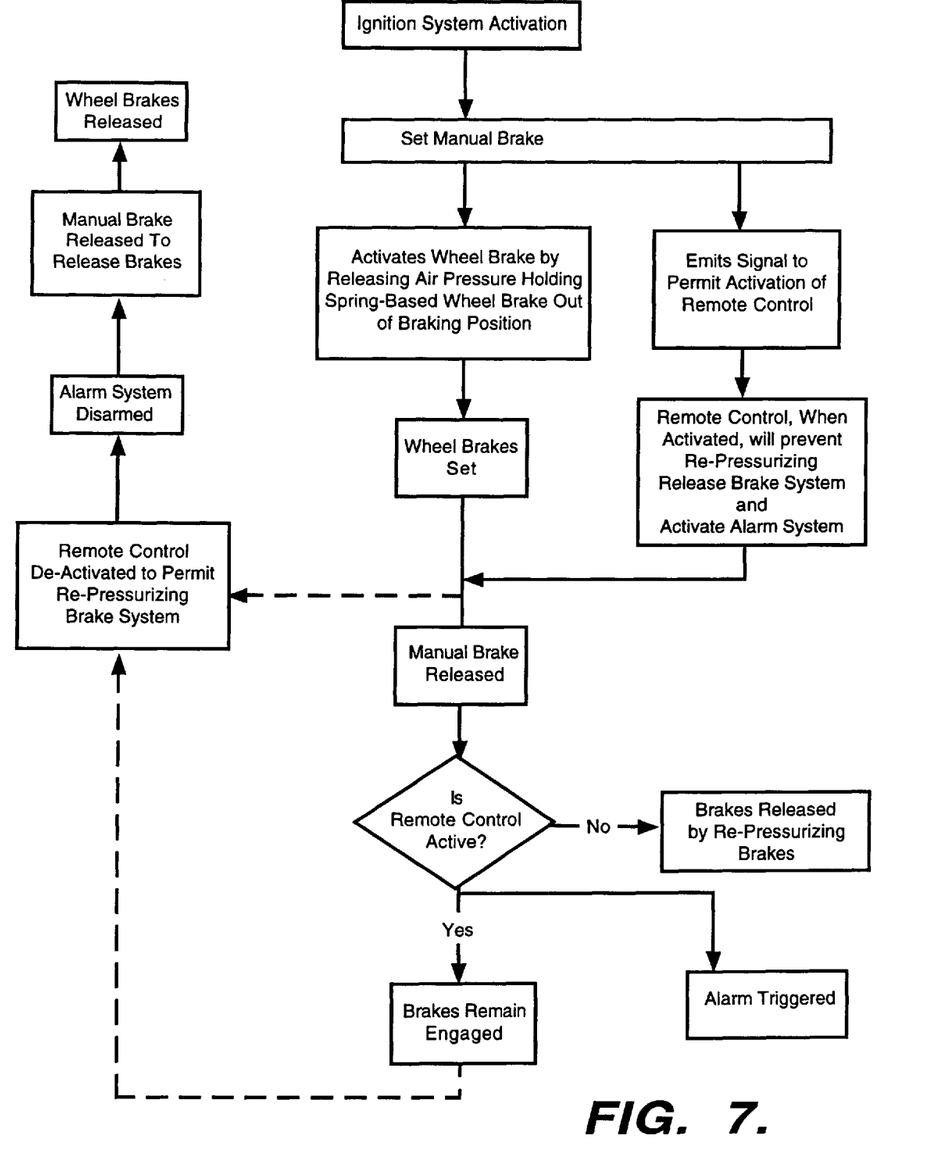
FIG. 7 is a flow chart indicating operation of the anti-theft system of the present invention.

A flow chart for the operation of the system is shown in FIG. 7. Setting the manual brake 20 will activate the wheel brakes 14 by removing air pressure from biased elements 16 thereof. A signal is also generated for the remote control 50 so that remote control can be activated. The remote control is activated which moves element 44 from a port opening position to a port covering position so air pressure cannot be re-established to brakes 14. As soon as someone tries to release the brakes by moving the manually operated mechanism 20, switch 70 senses pressure in line 32; however, this pressure is not applied to the brakes because port 44 remains closed. Thus, the brakes cannot be released. However, switch 70 closes the circuit between power source 64 and siren 62 to activate that siren.

When authorized use of the vehicle is to be made, the remote control is de-activated. Element 44 is then removed from port 42, and switch 70 is activated to the normally open position, also, switch PS-2 is activated removing the alarm from an activated condition. When manual control 20 is released, air pressure is established through line 32 to brakes 14 and the wheel brakes are released.

Referring to FIGS. 1, 5, 6 and 9, it will be understood that the anti-theft system of the present invention can be used to protect against unauthorized movement of a trailer of the tractor/trailer combination. The anti-theft system used for the trailer is similar to the just-described system for the tractor. Therefore, the trailer system will not be discussed in great detail. It is noted that the trailer T has an air-operated brake means 14' for stopping rotation of at least one road engaging wheel of the trailer. The air-operated brake means 14' is fluidically connected to air source 12 via second fluid line 32 and manually-operated control means 20. Brake means 14' includes a biased element 16' that is biased against air pressure to apply braking pressure to the wheel of the trailer when air pressure is applied to the biased element and releases braking pressure from the wheel of the trailer when air pressure is released from the biased element. The remote control means 50' receiver is associated with the trailer and includes a second normally-closed pressure-sensitive switch 70' fluidically connected to second fluid line 32 near brake means 14' for stopping rotation of the trailer wheel which, when activated, is biased onto a normally open position and when de-activated moves into a closed position for connecting power supply 64 to either alarm 12 or alarm 72' when manually-operated control means 20 is moved back to a position to be de-activated after the manually-operated control means and the remote control means have been activated. The remote control means 50' further has means, such as momentary switch 52' thereon for activating and de-activating the alarm siren 72 and 72'.

It is understood that while certain forms of the present invention have been illustrated and described herein, it is not to be limited to the specific forms or arrangements of parts described and shown. Certain alternatives will occur to those skilled in the art based on the teaching of this disclosure, and these alternatives are intended to be within the coverage of this disclosure as well. However, the inventor can envision some cases where the foot pedal could be used as the key to the anti-theft system in the manner discussed above for the control 20. Accordingly, this form of the invention is intended to be covered by this disclosure and the following claims as well.

I claim:

1. An anti-theft mechanism for use on a motor vehicle, such as a tractor trailer, comprising:
   A) an air brake system which includes
      (1) a source of air,
      (2) a manual air-operated brake means for stopping rotation of at least one motor vehicle road-engaging wheel, said air-operated brake means including
         (a) a biased mechanism that is biased against air pressure to apply braking pressure to the wheel when air pressure is released from the biased mechanism and releases braking pressure from the wheel when air pressure is applied to the biased mechanism, and
         (b) a manually-operated control means for releasing air pressure from the biased mechanism to set the brake means when activated and when de-activated to fluidically connect the source of air pressure to the biased mechanism of said brake system to apply air pressure to the biased mechanism to overcome the bias of the biased mechanism for releasing the brake means and permitting rotation of the wheel, said manually-operated control means further including a signal transmitter for emitting a signal when said manually-operated control means is activated to set the brake means into a wheel rotation preventing configuration;
   B) a first fluid line fluidically connecting the source of air to said manually-operated control means;
   C) a second fluid line fluidically connecting said manually-operated control means to the biased mechanism of said brake means;
   D) a control valve fluidically located in said second fluid line in fluid series between said manually-operated control means and the biased mechanism of said air-operated brake system and including
      (1) a vent port in said second fluid line,
      (2) a port-covering valve means on said second fluid line for closing and opening said vent port,
      (3) a mechanism connected to said port-covering valve means to move said port-covering valve means to a port opening position when deactivated to a port closing position when activated whereby air pressure cannot be applied to the biased mechanism of said air-operated brake system through said second fluid line when said port-covering valve is in the port closing position and air pressure can be applied to the biased mechanism of said air-operated brake system through said second fluid line when said port-covering valve is in the port opening position,
      (4) a remote control means for activating the mechanism of said control valve to close said vent port to prevent release of said air-operated brake means after activation of said manually-operated control means into a brake-setting configuration even if said manually-operated control means is then moved back into a brake-releasing configuration and for de-activating the mechanism of said control valve to open said vent port for releasing said air-operated brake means when said manually-operated control means is thereafter moved into the brake-releasing configuration, said remote control means including a manually-operated means for activating and de-activating said remote control means and a signal transmitter which emits a signal when said remote control means is activated, and
      (5) a signal receiver in said control valve responsive to a signal emitted by the signal transmitter in said remote control means for activating the mechanism in said control valve to move said port-covering valve into said port opening position after said manually-operated control means has been activated and after said remote control means has been activated; and
   E) said remote control means including a signal receiver that is responsive to the signal emitted by said manually-operated control valve when the manually-operated control valve is activated to permit activation of said remote control means and permit said remote control means to be operated for activating the mechanism of said control valve whereby said remote control means will not be activated and thus cannot be operated until after said manually-controlled means has been activated into a brake setting condition.

2. The anti-theft mechanism defined in claim 1 further including an electrical ignition circuit means for operating the motor vehicle, an audible alarm, power means for said alarm, means for connecting and disconnecting said ignition circuit means to said power means, and an alarm circuit means for connecting said alarm to said power means when the manually-operated control means is operated while the mechanism of said control valve is in said port closing position.

3. The anti-theft mechanism defined in claim 1 further including a second air-operated brake means for stopping a second motor vehicle road wheel and which is connected to said manually-operated control means and to said second fluid line to be controlled by said manually-operated control means and by said control valve.

4. The anti-theft mechanism defined in claim 3 further including a second alarm means connected to said electrical ignition circuit means to be activated when the manually-operated control means is activated while the port-covering valve means of said control valve is in said port closing position.

5. The anti-theft mechanism defined in claim 2 further including a normally-closed pressure-sensitive switch which, when activated, is biased onto a normally open position when said manually-operated control means is in position to release air pressure from the biased mechanism of said air-operated brake means and which moves into a closed position for connecting said power supply to said alarm when said manually-operated control means is moved into a position to connect the source of air to the biased mechanism of said air-operated brake after said pressure-sensitive switch is activated; and means for activating said pressure-sensitive switch.

6. The anti-theft mechanism defined in claim 5 wherein said means for activating said pressure-sensitive switch includes a second alarm circuit means for connecting said pressure-sensitive switch to the ignition circuit means so the pressure-sensitive switch can only be activated after the ignition circuit means has been connected to said power means.

7. The anti-theft mechanism defined in claim 6 further including a horn on the motor vehicle and wherein the circuit means of said remote control means further includes another circuit means for momentarily connecting said horn to said power means for momentarily activating said horn when said pressure-sensitive switch is activated.

8. The anti-theft mechanism defined in claim 7 further including a visible signal in the motor vehicle and wherein said remote control means further includes a visible signal circuit means for connecting said visible signal to said power means and activating said visible signal when said pressure-sensitive switch is activated.

9. The anti-theft mechanism defined in claim 7 wherein the motor vehicle includes a trailer having an air-operated brake means for stopping rotation of at least one road engaging wheel of the trailer, said air-operated brake means being fluidically connected to said source of air via said second fluid line and said manually-operated control means and including (a) a biased element that is biased against air pressure to apply braking pressure to the wheel of the trailer when air pressure is released from the biased element and releases braking pressure from the wheel of the trailer when air pressure is applied to the biased element, (b) said remote control means further including a second normally-closed pressure-sensitive switch fluidically connected to said second fluid line near the brake means for stopping rotation of the trailer wheel which, when activated, is biased onto a normally open position and when de-activated moves into a closed position for connecting said power supply to said alarm when said manually-operated control means is moved back to a position to be de-activated after said manually-operated control means and said remote control means have been activated; and means on said remote control for activating and de-activating said second pressure-sensitive switch.

10. The anti-theft mechanism defined in claim 9 wherein said means for activating said second pressure-sensitive switch includes a circuit means for connecting said second pressure-sensitive switch to the ignition circuit means so the second pressure-sensitive switch can only be activated after the ignition circuit means has been connected to said power means.

11. An anti-theft mechanism for use on a motor vehicle comprising:

A) a manually operated air brake system for stopping rotation of at least one road engaging wheel of a vehicle when applied and a signal transmitter which generates a signal when said manually operated air brake system is applied;

B) an anti-theft system on the vehicle which includes
   (1) an alarm, and
   (2) a port in an air line of said brake system for controlling operation of said brake system with said brake system being applied and released by placing said port in a brake system applying or releasing condition;

C) a remote activating system for activating said anti-theft system from a location remote from the vehicle after the manually operated air brake system has been applied;

D) an interlock system for preventing activation of said anti-theft system until after said manually operated brake system is applied; and E) means in said remote activating system for activating the alarm of said anti-theft system if said manually operated brake system is disengaged before de-activation of said anti-theft system and for maintaining the port of said brake system in a brake system applying configuration until after de-activation of said anti-theft system and including a signal receiver in said remote system responsive to a signal generated by said signal transmitter for moving said port into a brake system releasing configuration upon receiving the signal generated by said signal transmitter that said manually operated brake has been applied.

12. The anti-theft mechanism defined in claim 11 wherein said manually operated brake system includes a brake element which is normally biased into a wheel rotation preventing position, and releasing means for moving said brake element against the bias applied thereto into a wheel rotation permitting position when activated.

13. The anti-theft mechanism defined in claim 12 further including a manually operated control element for de-activating said releasing means when operated to set said brake element and prevent rotation of the wheel, and a remote control means for preventing activation of said releasing means after de-activation of said releasing means by said manually operated control element after said remote control means is operated.

14. The anti-theft mechanism defined in claim 11 wherein said port is closed when said port is in the brake system applying configuration.

15. The anti-theft mechanism defined in claim 14 wherein said port is open when said port is in the brake system releasing configuration.

* * * * *